United States Patent Office 2,899,446
Patented Aug. 11, 1959

---

2,899,446

IMPROVEMENT IN THE PROCESS OF PREPARING ENDRIN FROM ISODRIN

Daniel R. Marks, Memphis, Tenn., assignor to Velsicol Chemical Corporation, Chicago, Ill., a corporation of Illinois No Drawing. Application August 14, 1956
Serial No. 603,871

3 Claims. (Cl. 260—348.5)

This invention relates to the preparation of a stable halogenated organic composition. In particular this invention relates to stable 1,2,3,4,10,10-hexachloro-6,7-epoxy-1,4,4a,5,6,7,8,8a - octahydro - 1,4,5,8 - dimethanonaphthalene having the structural formula:

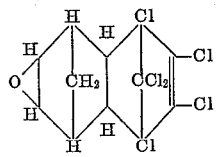

and an improvement in the preparation thereof. Hereinafter this compound will be referred to as endrin, its generic name.

U.S. Patent 2,676,132 describes the preparation of endrin and claims it as a new composition of matter. Endrin has rapidly gained recognition as an extremely valuable agricultural chemical being effective against numerous undesirable plant pests which are detrimental to such crops as cotton, cabbage, sugar beet, tobacco, corn, and the like. The list of insects against which it affords superior protection includes virtually every major insect pest. Further, its recognition as a superior insecticide is not limited to the United States, but on the contrary is worldwide.

Consequently, it is desirable that an efficient method for the preparation of this valuable composition be readily available and of even further importance that the stability of the endrin product be such that one can obtain the maximum benefit of its valuable properties.

It is therefore an object of the present invention to prepare endrin which is relatively stable.

It is another object of the present invention to improve existing processes for the preparation of endrin.

Still other objects of the present invention will become apparent from the ensuing description.

Example IV of U.S. Patent 2,676,132 describes a process for the preparation of endrin by the reaction of beta - 1,2,3,4,10,10 - hexachloro - 1,4,4a,5,8,8a - hexahydro - 1,4,5,8 - dimethanonaphthalene, hereinafter referred to as isodrin which is its generic name, and peracetic acid. As described in that patent, this process is a satisfactory method for the preparation of this highly valuable compound. If performed in the absence of impurities and under optimum conditions, high yields of a relatively pure product (95–100%) may be obtained.

However, when this reaction is run in the presence of metallic contamination, serious difficulties are encountered in that several undesired side products are produced, the product is of low purity and it is rendered somewhat unstable by virtue of the large percentage of impurities. While neither the mechanism for this breakdown of the endrin product nor the identity of all of the products formed therefrom is known, it is believed to involve several complex structural modifications culminating in a breaking of the vital epoxy linkage. It is also not certain whether the metal directly attributes to this decomposition of the epoxide or acts as a catalyst for the destruction of the linkage by acid which may be present or acts in some other manner. However, it is known that this unexpected reaction causes serious difficulty in both the production of endrin and in its utility once it has been prepared. During the reaction performed in the presence of metallic contamination several undesirable by-products will be produced. While as previously indicated, their exact structures are not known, the preponderance thereof are believed to be ketones, the presence of which is indicated by infrared analysis of the product. This assumed rearrangement of the desired epoxide to the undesired ketone during the reaction of isodrin and peracetic acid could involve the rearrangement of the epoxy linkage to a C=O linkage and a shifting of a hydrogen atom to form an analogue of endrin. However, other ketones may be formed therein caused perhaps by the breaking up of the cyclic rings. In addition, still other compounds may result from the effect of the metallic contamination.

The formation of these compositions is undesirable for a multitude of reasons, including larger raw material costs to produce a given quantity, an impure product of questionable value, the possible necessity of additional purification equipment, and a general hindrance in the production and use of this insecticidally active compound.

In commercial preparation there are inherently present from numerous sources varying amounts of metallic contamination. This is exemplified by the fact that C.P. (chemically pure) grade glacial acetic acid, a solvent for said reaction, has been found to contain 0.2 p.p.m. (parts per million) iron, while C.P. anhydrous sodium acetate usable in the reaction as a buffering agent contains approximately 1 p.p.m. Other reactants often contain small quantities of these harmful metals, as does normal plant water. Also, such metal is often incorporated into the system from the equipment or it may be present in the solvent. Then, too, there is a tendency for this metal contamination to build up, that is, for only a part of it to be removed with a batch so that after a few batches the concentration becomes considerably increased. It is not unusual for the build-up of iron, nickel, etc., to reach as high as 40 p.p.m., and it can possibly go higher. Since it has been found that concentrations as low as 0.16 p.p.m. will adversely affect the purity and consequently the value of the product, the scope of the problem is readily ascertainable. In the absence of such contamination, endrin with a minimum purity of 95% is obtainable without recrystallization or other purification means. On the contrary, in the presence of the aforementioned metallic contamination, the purity of the endrin product will be low, and an inferior product as compared to the 95–100% pure endrin.

Since it takes a relatively minute amount of contamination to cause these adverse effects and since there are a multitude of sources for said metals, it is apparent that it is impractical and uneconomical to keep this low concentration of metal out of the reaction mixture. Thus, it is extremely desirable to otherwise prevent these detrimental consequences caused by metallic contamination and this is unexpectedly accomplished by the method herein described.

While the metallic contamination which actuates the aforementioned undesired change in product probably is not limited to any specific metal or group of metals, iron and nickel are the most common metals present in commercial preparations. Thus, it has been found that the presence of these metals during the preparation of endrin leads to undesired by-products and further to a less satisfactory product. This product as compared to technical endrin commercially produced in a metal free state is relatively unstable. It also contains color bodies, while the aforementioned product not adversely affected by metal in its production is white in color. The instability of this product creates some problems. For example, this metal containing endrin has a melting point much lower than pure endrin (245° C.), and since it is a mixed melting point will vary with the actual amount of by-product formed, metal content, and the like. This low melting point creates problems in drying the product and also in grinding, a standard operation in the preparation of commercial dry insecticide formulations. Further, the presence of these undesired compounds lowers the amount of insecticidally active ingredients in the product making it necessary to use higher concentration formulations, which may be impractical due to economic considerations or due to physical limitations, such as the inability of the carrier to adsorb said composition.

Unexpectedly, it has been found that this vexing problem can be solved by the utilization of dipicolinic acid in the production of endrin. Dipicolinic acid, which hereinafter will be referred to as DPA, is meta-2,6-pyridine dicarboxylic acid.

As previously indicated, I have performed many experiments on the preparation of endrin from isodrin in the presence of varying ratios of nickel or iron and DPA. In these laboratory experiments iron and nickel, inherently present in commercial operations, were added in varying quantities so as to simulate commercial conditions. The metal content thus was that added plus the small quantity already present from the reagent grade chemicals, etc. Glass equipment was utilized throughout all of these experimental runs. Table I shows the results of these reactions in all of which the following procedure was employed:

112.8 grams of isodrin, 118.8 grams of acetic acid and 2.3 grams of anhydrous sodium acetate (buffering agent) were charged to a 500 ml. three-necked glass flask equipped with stirrer, thermometer and addition funnel. This mixture was then heated to 60° C. at which point 66.4 grams of peracetic acid from the addition funnel were added over a ten-minute period. After a two-hour reaction period at 55–60° C. the mixture was heated to 90° C. and then cooled at room temperature. When cooled the product was filtered, washed, dried and analyzed by infrared. The nickel or iron added to the runs listed in Table I was added in the form of the corresponding sulphate. The material in the product which is not endrin (see column percent endrin) is unreacted starting material or undesired by-products.

As can be readily ascertained from the foregoing table, that while the presence of DPA in even low concentrations is highly beneficial, a minimum DPA:metal molar ratio of 1:1 is of even further advantage, and DPA:metal ratio of 2:1 or higher is preferred.

Thus from the table it is seen that mole ratios of DPA to metal above 4 produced a high grade product containing over 95% endrin. When this mole ratio is between about 1 and 4 the concentration of endrin in the product drops to between 90 and 95% below a mole ratio of DPA to metal of about 1, the concentration of final product is still lower, dropping to below 80.

The mode of addition of the DPA to the reaction zone may be performed by any of the methods known to the art for the addition of solid matter such as by the use of conveyor belts, manual addition, feed tanks, etc. It also may be added in its melted state although this is not a preferred method. Actually the amount of DPA added on a percentage basis in most cases is very small, and hence addition thereof to the reaction zone does not constitute a problem. If desired, the DPA may be added concurrently with the isodrin or one of the other charged reactants. Also, but not as an alternative to DPA being present during reaction, the DPA may be added to the final product after completion of the reaction and subsequent purification. This would prevent any degradation of the endrin due to metallic contamination during formulation and final use of the endrin. A standard blender for the mixing of solid materials may be used to incorporate this unique stabilizer with the endrin. While the amount of DPA necessary in such a mixture will depend on the amount of metal contamination it will encounter under the normal circumstances, from about 0.5 to 500 p.p.m. DPA (based on 100% endrin) should be adequate although smaller or larger concentrations may be used.

I claim:

1. In the process for preparing endrin from isodrin by epoxidizing isodrin with an organic per-acid, the improvement which comprises conducting said epoxidation reaction in a reaction mixture containing dipicolinic acid.

2. In the process for preparing endrin from isodrin by epoxidation of said isodrin, and wherein the reaction mixture is contaminated with metal of the group consisting of iron and nickel, the improvement which comprises performing said epoxidation in a reaction mixture containing dipicolinic acid.

3. The process of claim 2 wherein the dipicolinic acid is present in a ratio of from about 0.5 mole per mole of metal contaminant to about 15 moles per mole of metal contaminant.

TABLE I

*Effect of metallic contamination on preparation of endrin*

| Run No. | Ni (p.p.m.) | Fe (p.p.m.) | DPA (p.p.m.) | Mol DPA per Mol Metal | Product—Percent Endrin (By Weight) |
| --- | --- | --- | --- | --- | --- |
| 1 | | 96 | 166 | 0.581 | 78.6 |
| 2 | | 92 | 166 | 0.613 | 78.0 |
| 3 | | 85 | 166 | 0.651 | 70.4 |
| 4 | 86 | | 166 | 0.677 | 64.7 |
| 5 | | 75 | 166 | 0.741 | 79.4 |
| 6 | | 102 | 239 | 0.779 | 71.5 |
| 7 | | 68 | 166 | 0.819 | 78.3 |
| 8 | 46 | | 166 | 1.27 | 89.3 |
| 9 | 40 | | 166 | 1.45 | 91.5 |
| 10 | 35 | | 166 | 1.61 | 91.8 |
| 11 | | 32 | 166 | 1.75 | 89.4 |
| 12 | 30 | | 166 | 1.92 | 94.3 |
| 13 | 24 | | 166 | 2.48 | 94.7 |
| 14 | | 14 | 166 | 3.90 | 93.8 |
| 15 | 73 | | 842 | 4.06 | 96.0 |
| 16 | | 30 | 429 | 4.83 | 95.6 |
| 17 | 12 | | 166 | 4.93 | 97.7 |
| 18 | | 31 | 531 | 5.68 | 95.5 |
| 19 | | 9 | 166 | 6.26 | 96.7 |
| 20 | 4 | | 166 | 13.1 | 98.5 |
| 21 | | | 166 | | 97.9 |

References Cited in the file of this patent

UNITED STATES PATENTS

| 2,676,132 | Bluestone | Apr. 20, 1954 |
| 2,768,178 | Bellin | Oct. 23, 1956 |
| 2,768,179 | Bellin | Oct. 23, 1956 |
| 2,768,180 | Bellin | Oct. 23, 1956 |
| 2,768,181 | Bellin | Oct. 23, 1956 |
| 2,776,301 | Payne | Jan. 1, 1957 |